Oct. 30, 1934.  E. E. WEMP  1,978,658
CLUTCH
Original Filed April 23, 1932  2 Sheets-Sheet 1

INVENTOR.
Ernest E. Wemp
BY
Barnes, Kisselle & Laughlin
ATTORNEYS.

Oct. 30, 1934.　　　　E. E. WEMP　　　　1,978,658
CLUTCH
Original Filed April 23, 1932　　2 Sheets-Sheet 2
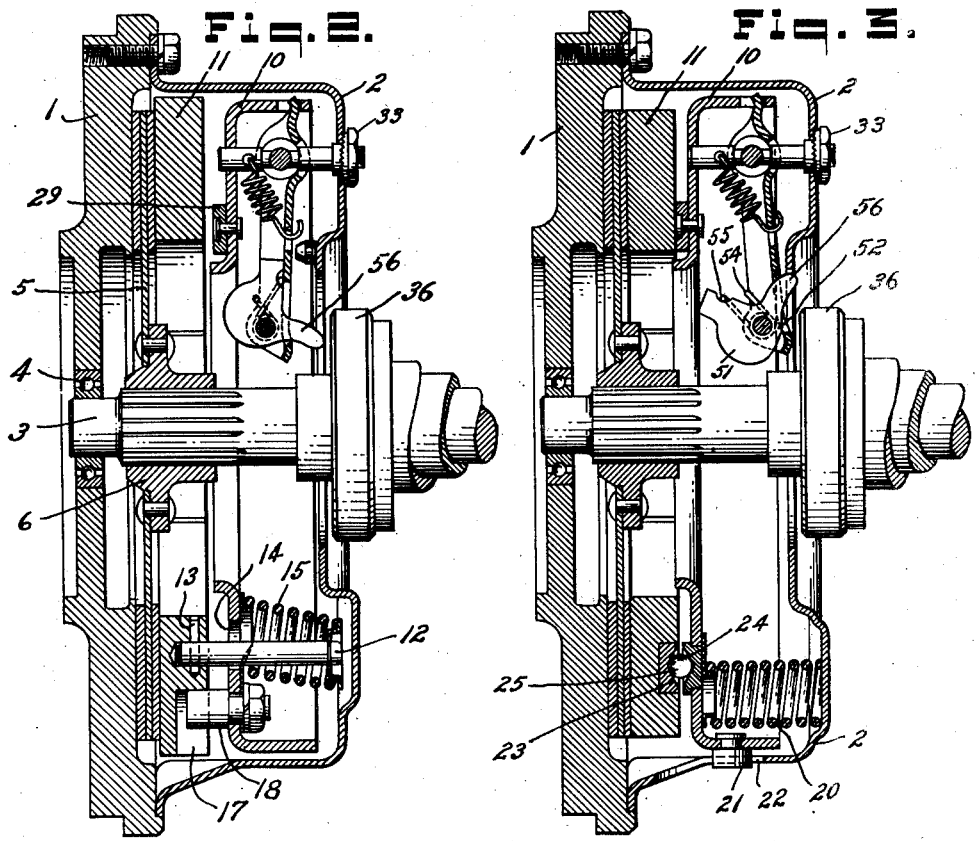
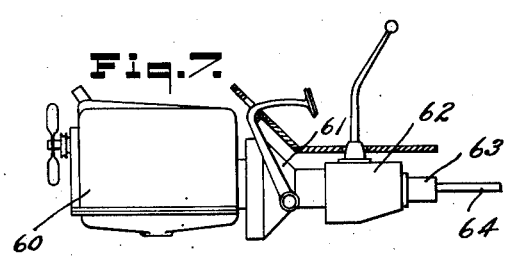
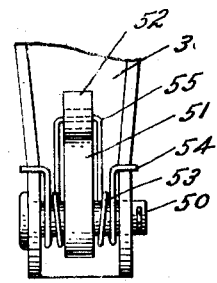
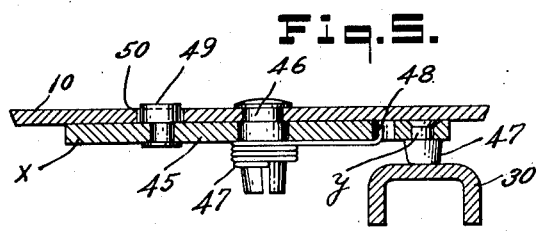
INVENTOR.
*Ernest E. Wemp*
BY *Barnes, Kisselle & Laughlin*
ATTORNEYS.

Patented Oct. 30, 1934

1,978,658

UNITED STATES PATENT OFFICE 1,978,658

CLUTCH

Ernest E. Wemp, Detroit, Mich.

Application April 23, 1932, Serial No. 607,066
Renewed March 24, 1934

12 Claims. (Cl. 192—105)

This invention relates to a clutch, and particularly one of an automatic nature adapted for use in automotive vehicles. The present clutch is one which has an automatic action for engagement and disengagement during normal vehicle operation, and centrifugal force may be utilized for effecting such clutching action. Automatically acting devices are employed with the clutch, serving as abutting elements, and filler elements, which are in position to perform their usual function during the normal operation of the clutch, but which may move out of their normal effective position when the clutch is inoperative, or in other words, is standing at rest, in order to permit and facilitate clutch engagement even though there is no centrifugal action. The objects of the invention are the provision of an improved clutch structure of the type mentioned involving the various improved structural features as regards the association of the several elements. A clutch of this nature is disclosed in copending application Serial No. 607,065, filed April 23, 1932.

In the accompanying drawings:

Fig. 2 is a similar sectional view showing the parts in normal engaged position.

Fig. 3 is a similar sectional view showing the parts in engaged position when the clutch is not rotating and is at rest.

Fig. 5 is an enlarged detail section taken substantially on line 5—5.

Fig. 6 is an enlarged detail showing a lever end structure.

Fig. 7 is a general view illustrating an environment for the clutch.

The flywheel of an internal combustion engine is illustrated at 1, and this wheel constitutes a clutch driving member, and attached to the flywheel by means of cap screws, as shown, is a cover plate 2. A driven shaft is shown at 3, which may be piloted in the flywheel, as at 4, and which may carry a driven disk 5 having hub 6 splined to the driven shaft.

Figure 4:
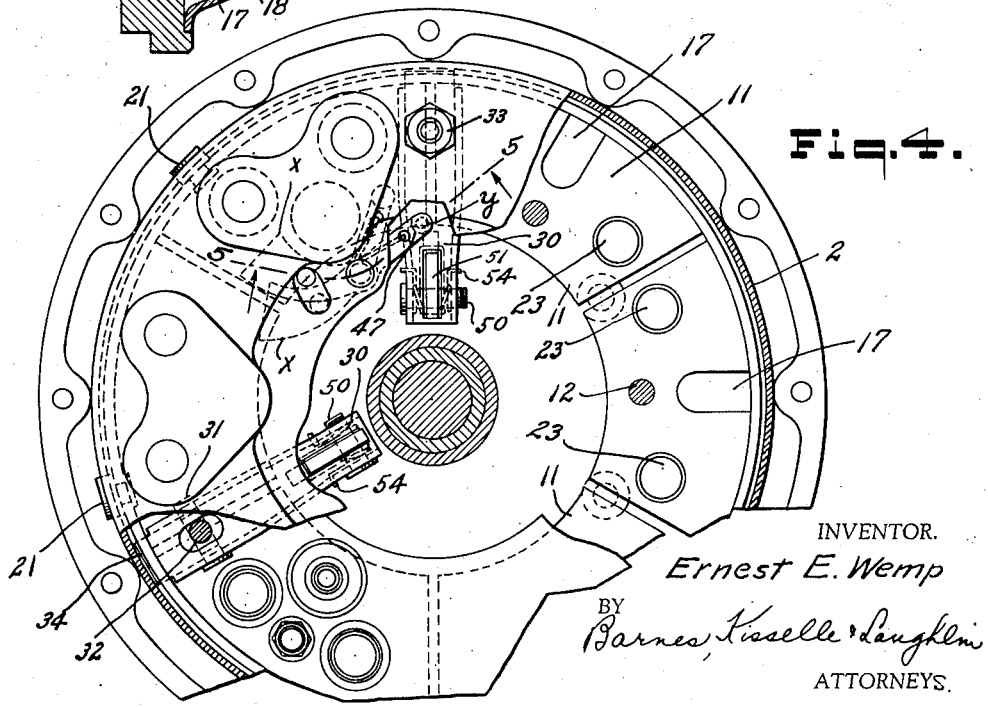
Fig 4 is an end view of the clutch with parts cut away and partly in section showing some of the control mechanism.

A carrier plate is shown at 10, and this carrier plate supports clutch driving members 11 of segmental form, as shown in Fig. 4. Each member 11 may have a stud 12 pinned thereto, by means of a pin 13, and which projects through an elongated opening 14 in the carrier plate. Surrounding each stud may be a spring 15 which backs up against the carrier plate, as shown, and which exerts its compression force against a spring retainer 16 fixed to the end of the stud 12. Each segment may have a recess therein, as shown at 17, cut through its outer peripheral edge for slidably receiving a stud 18 attached to the carrier plate. The carrier plate may be acted upon by clutch packing springs 20 (Fig. 3) which are backed up by the cover plate; these springs normally urge the carrier toward the flywheel. The carrier is driven by the driving parts of the clutch, and for this purpose may have studs 21 slidably received in slots 22 in the cover plate.

Figure 1:
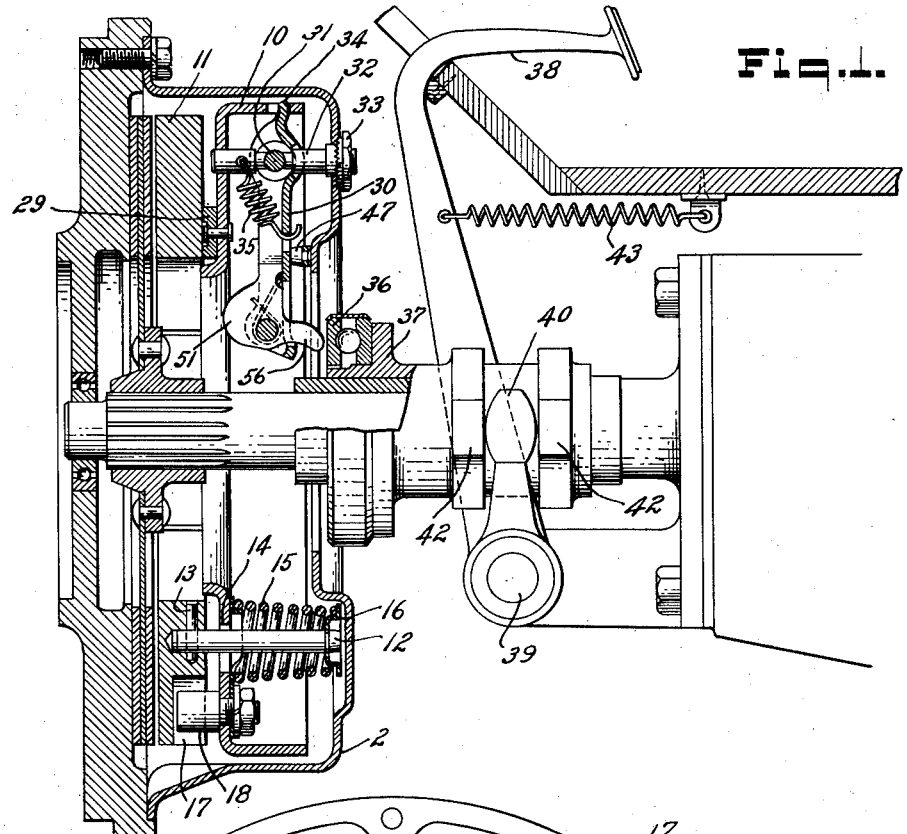
Fig. 1 is a view taken through a clutch constructed in accordance with the invention illustrating the parts in position of normal idling speed.

The segments 11 (Figs. 3 and 4) are each provided with recesses 23 of inverted frusto-conical form and the carrier plate may be provided with similar recesses 24 arranged so that recesses in the segments and the plate match in pairs; and pocketed in each matched pair of recesses is a roller element such as a ball 25. The recesses may be formed by separate hardened inserts. The springs 15 hold the segments and plate normally in close proximity to each other with the balls pocketed in the bottoms of the recesses as illustrated in Fig. 1. When there is sufficient centrifugal force the segments are shifted radially outwardly and the ball elements cooperate with the inclined faces of the pockets and shift the segments axially toward the driven member, as illustrated in Fig. 2. The studs 18 strike the bottom of the recesses 17 and serve to limit the outward radial movement of the segments. In the radial shift of the segments the pins 12 are accommodated by the elongated slots 14. When the segments shift to the position as illustrated in Fig. 2 they pack the driven disk against the flywheel and engage the clutch, and the effective pressure of clutch engagement is constituted by the power of the several clutch packing springs 20. The carrier plate is arranged to shift axially relative to the cover plate by means of the studs 21 being accommodated in the slots 22.

It will be noted that the springs 15 each act upon its respective segment 11, at a point which is off-center as regards the segment. This may cause the segments to cock or tilt slightly out of the plane of rotation. To compensate for any such possibility, contact members 29 may be secured to the carrier plate and located as shown in Fig. 4, so that each contact member bridges the space between two adjacent segments. These contact members provide abutments for the inner portions of the segments so that when the springs 15 retract the segments, as shown in Fig. 1, the segments may abut the elements 29 so that they are maintained substantially in a correct plane.

The clutch is arranged to be released by physical effort of an operator, for which purpose there are a number of throw-out levers 30 of which there are three in the present instance (see Fig. 4) fulcrumed as at 31 on studs 32, and the fulcrums may be adjusted by nuts 33. The outer ends of the levers are engaged in notches in the carrier plate as illustrated at 34 and the inner ends are arranged for association with a clutch throw-out member. Light coil springs 35 may be used to keep the parts from rattling and in close engagement with each other.

A clutch throw-out bearing, advantageously of anti-friction type, is shown at 36, and it may be mounted upon the reciprocable member 37 for manual operation. The usual clutch throw-out lever is illustrated at 38 provided with a pedal, as shown, arranged to rock upon or around shaft 39 and connected to the shaft or lever are arms 40 engaged between ears 42 on the member 37. The lever may be held normally retracted by a spring 43.

Centrifugal stop means are mounted upon the carrier plate, as shown in detail in Fig. 6. Such a stop member is shown at 45 pivotally mounted upon a stud 46 carried by the carrier plate and having a stop member 47 at one end for moving into alignment with a lever 30. A torsion spring 47 may have one end, as at 48, turned into a recess in the member, and the pivotal movement of the member on stud 46 may be limited by a stud 49 operating in an elongated slot 50 of the carrier plate. This structure will be seen in Fig. 4; during normal clutch operation when the parts are rotating at or above normal idling speed for the engine which, for example, may be at or about 400 R. P. M., the members 45 are acted upon by centrifugal action to position them, as shown by the full lines in Fig. 4. The end X of each member is heavier than the end Y so that centrifugal action throws the end X radially outwardly and the stops 47 are positioned so as to engage levers 30. When the parts are brought to a stop, or in other words, in the absence of any or substantial rotation the torsion springs may shift the centrifugal members 45 to the dotted line position shown in Fig. 4, in which position the members 47 clear the levers.

Other centrifugal space filler elements may be associated with the inner lever ends and throw-out bearing 36. By referring to Fig. 6 it will be seen that the inner end of a lever is provided with a fulcrum pin 50 upon which is mounted a pivoted member 51 operating through a slot 50 in the lever. A torsion spring 53 may have parts wound around the fulcrum pin with its ends 54 engaging the lever 30, and with a center portion 55 engaging the centrifugal member 51. These members are arranged so that when the parts are at rest, or in other words, not rotating, or in the substantial absence of centrifugal action, the torsion spring causes the members to take a position as shown in Fig. 3. The members 45 and 51 are acted upon centrifugally at an R. P. M. below normal motor idling speed, i. e., 400 R. P. M., so that the stops 47 and the portions 56 are in stopping position as shown in Figs. 1 and 2 at all normal motor speeds.

The clutch is one designed to be utilized in connection with a free wheeling unit; or in other words, a one way drive connection is employed between the motor and the vehicle driving parts in order to permit the vehicle to overrun the engine. This is depicted generally in Fig. 7 where the motor engine is illustrated at 60, the clutch housing at 61, the transmission case at 62 and a housing 63 between the transmission case and propeller shaft 64 which may house the free wheeling unit. It is unnecessary to show or describe the free wheeling structure as one of several types may be used, and all are known to those skilled in the art. For the purpose of illustration, though, it may be pointed out that a coil spring clutch may be used, or the so-called roller type of clutch embodying rollers combined with inclined or cam surfaces. Thus, the engine may be decelerated while permitting the vehicle to continue overrunning the engine to the end that the clutch may be opened and the gear shift made.

The operation of the clutch is as follows: with the parts rotating at normal engine idling speed the several elements may assume, and do normally assume, the position as illustrated in Fig. 1. The clutch is disengaged. The springs 20 are tending to engage the clutch but this is prevented as the levers 30 are blocked from movement by the studs 47. As the parts are accelerated, centrifugal action shifts the segments and the clutch becomes engaged, as illustrated in Fig. 2. It will be obvious how the clutch may be engaged and disengaged by acceleration and deceleration of the engine, and how gear shifting may be accomplished during clutch disengagement. When the parts are in normal idling position, as illustrated in Fig. 1, the centrifugal elements 51 are in the position shown, with their filler elements 56 adjacent the throw-out bearing 36, but preferably slightly spaced therefrom in order that there may be a little clearance. When the clutch is engaged by engine acceleration the levers swing and the parts 56 move away from the bearing 36, as illustrated in Fig. 2. The operator may disengage the clutch at any time while it is engaged by depressing the lever 38 causing the bearing 37 to engage the members 56 thus rocking the levers 30 and retracting the carrier plate and, in fact, retracting the entire assembly of carrier plate and segments. Thus it will be appreciated how the clutch is entirely automatic for engagement and disengagement during engine operation.

Assume now that the engine is idling with the parts in the position shown in Fig. 1 and the engine is stopped. It may be desirable at this time to have the clutch engaged so that the engine compression may be utilized as a braking agency for the vehicle. As soon as the engine stops the members 51 shift to the position illustrated in Fig. 3. This increases the effective clearance between clutch throw-out bearing 36 and the inner ends of the clutch throw-out levers. The clutch is still disengaged, however, because the levers are blocked by the elements 47. The operator may now depress the lever 38 to advance the clutch throw-out bearing 36 and rock the levers 30 in order to free them of frictional engagement with the members 47; immediately the torsion springs 47 shift the centrifugal elements 45 to a position as illustrated by the dotted lines in Fig. 4, so as to clear the levers. The operator may now allow the clutch pedal 38 to retract and the clutch packing springs 20 shift the carrier plate and segments into frictional engagement with the driven disk as illustrated in Fig. 3.

It will be noted that if it were not for the fact that the members 56 move out of the way so as not to engage the bearing 36, that the clutch could not be engaged as the members 56 would contact with the bearing 36 and prevent clutch engagement after a manner identical with which the elements 37 prevent clutch engagement by impeding the action of the springs 20. This is because the member 36 can retract no further than a given position, as is usually determined by the lever 38 striking the toe boards or some other fixed stop, as illustrated in Fig. 1. Accordingly, the inner ends of the levers may move back into clutch proximity with the throw-out bearing member 36, as illustrated in Fig. 3.

As soon as the engine is again started the segments 11 will shift radially outward upon requisite R. P. M. and effect a backing up of the carrier plate 10 against the pressure springs 20. This will rock the levers 30 to a position as illustrated in Fig. 2 and then by centrifugal action the stops 47 may automatically move into stopping position. Similarly, the members 51 shift by centrifugal action back to effective position.

The members 51 are provided largely for the purpose of maintaining normal clutch clearance during the automatic action of the clutch by centrifugal action; that is, normal clutch clearance as regards the clutch throw-out levers and the bearing 36. In order to permit the clutch to engage when the parts are stopped, the clutch throw-out lever must retract toward the bearing 36, as illustrated in Fig. 3. Under normal operating conditions the clutch throw-out lever must retract toward the bearing 36, as illustrated in Fig. 3. Under normal operating conditions the clutch throw-out levers take the positions as illustrated in Figs. 1 and 2; were it not for the fact that the members 56 fill in the clearance between the clutch throw-out levers and bearing 36, at this time, the clutch pedal 38 would of necessity have to be depressed through a long range of movement before the bearing 36 would even contact with the ends of the levers 30, and then possibly there would not be enough further movement of the pedal permitted to completely disengage the clutch. However, the members 51, through their filler elements 56, function to maintain a similar cooperative relation between the levers 30 and the throw-out member 36 irrespective of whether the parts are functioning while rotating or while at rest.

I claim:

1. A clutch comprising in combination, a driving member, a clutch cover secured to the driving member, a carrier plate, clutch packing springs between the cover and carrier plate, means interengaging the carrier plate and cover for establishing a driving connection and permitting the carrier plate to shift axially relative to the cover, another driving member constituted by a plurality of segments, means supporting each segment from the carrier plate, said segments being acted upon by centrifugal action, means arranged to shift the segments axially relative to the carrier plate when the segments shift by centrifugal action, and a clutch driven member arranged to be packed between the first mentioned driving member and the second mentioned driving member.

2. A clutch comprising a driving member, a clutch cover secured to the driving member, a carrier plate, packing springs associated with the cover and carrier plate, driving studs in driving slots with the studs and slots connecting the cover and carrier plate and with the studs in one member and the slots in the other and permitting relative axial movement between the two members, a plurality of segments carried by the carrier plate and constituting another clutch driving member, said segments being shiftable relatively radially outwardly by centrifugal action, driving studs in slots establishing a connection between each segment and the carrier plate and permitting said shift of the segments, means for shifting the segments axially upon radial shift by centrifugal action, and a driven clutch member disposed to be packed between the first mentioned driving member and the segments upon such axial shift of the segments.

3. A clutch comprising in combination, a flywheel, a clutch cover carried by the flywheel, a carrier plate within the cover, driving studs on the carrier plate, said cover having slots for receiving the driving studs, and said slots being elongated to permit of axial movement of the carrier plate, packing springs acting upon the carrier plate, a plurality of centrifugal segments carried by the carrier plate, other driving studs on the carrier plate, each segment having a radial slot for the reception of the driving stud with the slots elongated to permit radial shift of the segments, means for shifting the segments axially as they shift radially by centrifugal action, and a driven clutch member positioned to be packed between the flywheel and the segments.

4. A clutch comprising in combination, a driving member, a clutch cover, a carrier plate within the cover, a plurality of centrifugal segments carried by the carrier plate, means establishing a driving connection between the cover and the carrier plate and between the carrier plate and segments, said segments being shiftable radially outwardly incident to centrifugal action, means for shifting the segments axially upon said radial outward shift, and a driven disk in a position to be packed between the first mentioned driving member and the segments with direct contact with the segments when the same shift axially.

5. A clutch comprising in combination, a driving member, a clutch cover, another driving member including a carrier plate within the cover and radially shiftable centrifugal weight members supported by the carrier plate, packing springs for urging the carrier plate and weight members toward the first mentioned driving member, a driven disk positioned to be engaged between the first driving member and said weight members, means for impeding the action of the packing springs in their action upon the carrier plate and weight members, and means for shifting the segments axially into direct contact with the driven member as the said weight members shift incident to centrifugal action.

6. A clutch comprising in combination, a driving member, a clutch cover, another driving member including a carrier plate within the cover and radially shiftable centrifugal weight members supported by the carrier plate, packing springs for urging the carrier plate and weight members toward the first mentioned driving member, a driven disk positioned to be engaged between the first mentioned driving member and said weight members, centrifugally controlled means for impeding the action of the packing springs in their action upon the carrier plate and weight members, and means for shifting the segments axially into direct contact with the driven member as the said weight members shift incident to centrifugal action.

7. In a centrifugal clutch, a driving member, a driven member, another driving member including elements shiftable by centrifugal action for engaging the driven member between said elements and the first mentioned driving member, a manually shiftable clutch throw-out member, clutch throw-out levers, said levers being shifted upon actuation of said elements incident to centrifugal action, and centrifugally controlled space filler means on each lever for varying the effective working clearance between said levers and the clutch throw-out member.

8. In a centrifugal clutch, a driving member, a driven member, another driving member including elements shiftable by centrifugal action for engaging the driven member between said elements and the first mentioned driving member, a manually shiftable clutch throw-out member, clutch throw-out levers, said levers being shifted upon actuation of said elements incident to centrifugal action, and centrifugally controlled space filler means on each lever for varying the effective working clearance between said levers and the clutch throw-out member, said centrifugally controlled means comprising each a part fulcrumed on an axis transverse to the axis of rotation of the clutch parts.

9. A clutch comprising in combination, a flywheel or the like, a clutch cover, a clutch driving member including elements shiftable by centrifugal action, a clutch driven member, packing springs acting upon the clutch driving member, said clutch driven member being packed between the flywheel and elements when said elements shift by centrifugal action, clutch release levers associated with the clutch driving member, a clutch throw-out member for actuating the levers, each release lever being provided with a slot, a fulcrum pin on each lever positioned transversely of the axis of rotation of the clutch parts, and a centrifugally controlled element pivotally mounted upon each fulcrum pin and each having a part shiftable into and out of the position between the ends of the lever upon which it is mounted and the clutch throw-out member.

10. A clutch comprising in combination, a flywheel or the like, a clutch cover, a clutch driving member including elements shiftable by centrifugal action, a clutch driven member, packing springs acting upon the clutch driving member, said clutch driven member being packed between the flywheel and elements when said elements shift by centrifugal action, clutch release levers associated with the clutch driving member, a clutch throw-out member for actuating the levers, each lever being provided with a slot, a fulcrum pin on each lever positioned transversely of the axis of rotation of the clutch parts, a centrifugally controlled element pivotally mounted upon each fulcrum member and each having a part shiftable into and out of the position between the end of the lever upon which it is mounted and the clutch throw-out member, and a spring acting upon each centrifugally controlled member arranged to position said members with their parts away from the clutch throw-out member when said members are not acted upon by centrifugal action.

11. A clutch comprising in combination, a flywheel, a cover plate, a clutch driven member, a clutch driving member within the cover plate comprising a carrier plate, driving studs thereon, said cover having slots for receiving the studs, clutch throw-out levers for shifting the carrier plate, packing springs for urging the carrier plate toward the driven member, centrifugally controlled means for impeding the action of the packing springs, a plurality of segmental weights on the carrier plate, means normally holding the weights away from the driven disk, driving studs on the carrier plate, one for each segment, each segment having a slot for receiving a stud, the bottom of each slot being adapted to engage a stud to limit the radial outward movement of a segment under centrifugal action, and means for shifting the segments axially of the carrier plate when the segments move radially outward incident to centrifugal action.

12. A clutch comprising in combination, a flywheel, a cover plate, a clutch driven member, a clutch driving member within the cover plate comprising a carrier plate, driving studs thereon, said cover having slots for receiving the studs, clutch throw-out levers for shifting the carrier plate, packing springs for urging the carrier plate toward the driven member, centrifugally controlled means for impeding the action of the packing springs, a plurality of segmental weights on the carrier plate, driving studs on the carrier plate, one for each segment, each segment having a slot for receiving a stud, the bottom of each slot being adapted to engage a stud to limit the radial outward movement of a segment under centrifugal action, means for shifting the segments axially of the carrier plate when the segments move radially outward incident to centrifugal action, and spring means for retracting the segments toward the carrier plate effective when the centrifugal force is relatively low.

ERNEST E. WEMP.